United States Patent [19]

Sanada et al.

[11] Patent Number: 5,073,620
[45] Date of Patent: Dec. 17, 1991

[54] THERMOPLASTIC RESIN COMPOSITION

[75] Inventors: Takashi Sanada; Kaoru Kitadono; Yasurou Suzuki; Taichi Nishio; Hiroomi Abe; Noriyasu Kagawa, all of Chiba, Japan

[73] Assignee: Sumitomo Chemical Company, Limited, Osaka, Japan

[21] Appl. No.: 317,838

[22] Filed: Mar. 3, 1989

[30] Foreign Application Priority Data

Mar. 30, 1988 [JP] Japan ................... 63-79808

[51] Int. Cl.$^5$ .............. C08L 51/04; C08L 53/02; C08L 71/12; C08L 77/02
[52] U.S. Cl. ............................ 525/68; 525/92; 525/132; 525/152; 525/391; 525/395; 525/396; 525/397; 525/905
[58] Field of Search .............. 525/397, 905, 391, 395, 525/396, 68, 92, 132, 152

[56] References Cited

U.S. PATENT DOCUMENTS

| 3,379,792 | 4/1968 | Finholt . |
| 4,315,086 | 2/1982 | Ueno et al. . |
| 4,338,421 | 7/1982 | Maruyama et al. . |

FOREIGN PATENT DOCUMENTS

| 0205816 | 12/1986 | European Pat. Off. . |
| 0226910 | 7/1987 | European Pat. Off. . |
| 0231626 | 8/1987 | European Pat. Off. . |
| 0237710 | 9/1987 | European Pat. Off. . |
| 0244090 | 11/1987 | European Pat. Off. . |
| 0248526 | 12/1987 | European Pat. Off. . |
| 53-47390 | 12/1978 | Japan . |
| 62-129350 | 6/1987 | Japan . |
| 63-35650 | 2/1988 | Japan . |
| 63-68663 | 3/1988 | Japan . |
| 8705304 | 9/1987 | PCT Int'l Appl. . |

*Primary Examiner*—Jacob Ziegler
*Attorney, Agent, or Firm*—Cushman, Darby & Cushman

[57] ABSTRACT

(A) 10–70 parts by weight of a polyphenylene ether, a mixture of a polyphenylene ether and a polystyrene or a polyphenylene ether-styrene graft copolymer, (B) 90–30 parts by weight of a mixture of (i) a thermoplastic aromatic copolyamide and/or an aromatic nuclear-hydrogenated copolyamide in an amount of 0.1–70% by weight of existing total polyamide and (ii) a thermoplastic aliphatic polyamide in a complementary amount of 99.9–30% by weight of existing total polyamide, and (C) 0.01–30 parts by weight, based on 100 parts by weight of the above components (A) and (B) of, at least one compound selected from the group consisting of oxazoline and a compound having, in its molecule, (a) carbon-carbon double bond or a carbon-carbon triple bond and (b) at least one functional group selected from carboxyl group, acid anhydride group, amino group, acid amide group, imido group, epoxy group, carboxylate ester group, isocyanate group, methylol group, oxazolidine group and hydroxyl group.

This composition may further contain an impact strength modifier, namely, rubber-like material and/or modified rubber-like material.

18 Claims, No Drawings

THERMOPLASTIC RESIN COMPOSITION

BACKGROUND OF THE INVENTION

The present invention relates to a resin composition which comprises a polyphenylene ether resin and a copolyamide resin.

More particularly, it relates to a novel thermoplastic resin composition which comprises a resin composition comprising a polyphenylene ether, an aliphatic polyamide and a specific compatibilizing agent, to which a thermoplastic aromatic copolyamide and/or an aromatic nuclear-hydrogenated copolyamide is added at a specific ratio.

The thermoplastic resin composition is excellent in mechanical properties, especially less in reduction of flexural modulus when absorbing water and superior in processability.

The thermoplastic resin composition can be made into shaped articles, sheets, etc. by injection molding, extrusion molding, etc.

Resin compositions comprising a polyphenylene ether resin and a polyamide resin such as nylon 6 or 66 have been known, as disclosed in Japanese Patent Publication (Kokoku) Nos. 45-997 and 53-47390, Japanese Patent Publication (Kokai) Nos. 56-16525, 56-26918, 61-66452, 62-151456, 62-129350 and 62-250050 and U.S Pat. No. 4,315,086.

These resin compositions have improved respective defects of the two resin components, for example, low processability and low solvent resistance of the polyphenylene ether resin and low heat resistance and high water absorbency of the polyamide resin. Thus, they are recently extended to a wide range of applications such as electric parts, mechanical parts, sports goods, automobile parts, especially exterior trim parts.

However, even such resin compositions still have problems in properties for practical use.

Resin compositions comprising a polyphenylene ether and an aliphatic polyamide having a relatively high concentration of amide group such as nylon 6, nylon 66 and nylon 46 are fairly improved in water absorbency, compared with polyamide per se. However, they still have a significant defect that water absorption varied depending on content of polyamide, and absorption of water of such a small amount as about 1% based on the composition causes considerable deterioration of properties, especially reduction of flexural modulus.

Furthermore, thermal expansion coefficient of these resin compositions are lower than that of polyamide per se, but still higher than that of metallic materials and that of polyphenylene ether per se. Thus, they have another defect that their distortion is great at high temperature due to such thermal expansion.

SUMMARY OF THE INVENTION

An object of the present invention is to provide a polyphenylene ether/polyamide resin composition which is highly improved in stiffness upon absorption of water.

Another object of the present invention is to provide a polyphenylene ether/polyamide resin composition which has a low thermal expansion coefficient.

On the one hand, the aliphatic polyamide, especially nylon 46, nylon 6 or nylon 66 has relatively high crystallinity and excellent oil resistance, heat resistance and toughness.

On the other hand, a thermoplastic aromatic copolyamide such as polyhexamethylene isophthalamide, i.e., nylon 6I has a higher heat distortion temperature under high load than the aliphatic polyamide, but is generally low in crystallinity and hence, is great in distortion in hot water and high in absorption of alcohol.

Under such circumstances, the inventors made an intensive research on resin compositions containing polyphenylene ether and polyamide in an attempt to eliminate the significant defects of the resin composition containing polyphenylene ether and aliphatic polyamide, i.e., the considerable reduction of flexural modulus caused by absorption of water and the high thermal expansion coefficient under high temperature, without damaging other properties.

As a result, it has been found that a polyphenylene ether/polyamide resin composition which has excellent balance of properties, can be obtained by using a polyamide which comprises an aliphatic polyamide and a thermoplastic aromatic copolyamide and/or an aromatic nuclear-hydrogenated copolyamide at a specific ratio.

That is, the present invention relates to a thermoplastic resin composition which comprises:

(A) 10–70 parts by weight of a polyphenylene ether, a mixture of a polyphenylene ether and a polystyrene or a polyphenylene ether/styrene graft copolymer, (B) 90–30 parts by weight of a mixture of (i) a thermoplastic aromatic copolyamide and/or an aromatic nuclear-hydrogenated copolyamide in an amount of 0.1–70% by weight of the existing total polyamide and (ii) a thermoplastic aliphatic polyamide in a complementary amount of 99.9–30% by weight of the existing total polyamide, and (C) 0.01–30 parts by weight, based on 100 parts by weight of the above components (A) and (B), of at least one compound selected from the group consisting of oxazoline and a compound having, in its molecule, (a) carbon-carbon double bond or a carbon-carbon triple bond and (b) at least one functional group selected from carboxyl group, acid anhydride group, amino group, acid amide group, imido group, epoxy group, carboxylate ester group, isocyanate group, methylol group, oxazolidine group and hydroxyl group.

The component (C) hereinafter referred to as "compatibilizing agent".

DESCRIPTION OF THE INVENTION

The polyphenylene ether used in the present invention is homopolymer or copolymer composed of the following repeating unit (I) or (I) and (II):

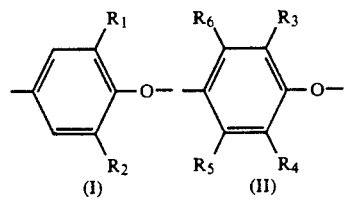

wherein $R_1$, $R_2$, $R_3$, $R_4$, $R_5$ and $R_6$ which may be identical or different each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

The polyphenylene ether may be a mixture of said homopolymer and said copolymer, a mixture of said polymer and polystyrene, or a graft copolymer of said polymer with styrene.

The homopolymer of polyphenylene ether includes poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol which is represented by the formula (III):

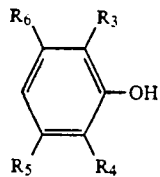

(III)

wherein $R_3$, $R_4$, $R_5$ and $R_6$ each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atom.

The thermoplastic aromatic copolyamide of component (B)(i) is a copolyamide containing an aromatic component therein, for example, polyhexamethylene isophthalamide (nylon 6I). The copolyamide containing an aromatic component therein means a melt-polymerizable polyamide containing as a main component an aromatic amino acid and/or an aromatic dicarboxylic acid such as para-aminomethylbenzoic acid, paraaminoethylbenzoic acid, terephthalic acid and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis(aminomethyl)cyclohexane and 1,4-bis(aminomethyl)cyclohexane. An isocyanate may also be used in place of the diamine.

Any other comonomers may be used, if necessary. Examples of the comonomers are 4,4'-diphenylmethane diisocyanate and tolylene diisocyanate. Other examples thereof are a unit of lactam, a unit of ω-amino acid of 4–12 carbon atoms, a compound derived from an aliphatic dicarboxylic acid of 4–12 carbon atoms and an aliphatic diamines of 2–12 carbon atoms, for example, lactams and amino acids such as ε-caprolactam, ω-caprolactam, 11-aminundecanoic acid and 12-aminododecanoic acid, and equimolar salts of the above-mentioned various diamines and adipic acid, azelaic acid or sebacic acid.

Typical examples of the thermoplastic aromatic copolyamides comprising these components are copolymer polyamide of p-aminomethylbenzoic acid and ε-caprolactam (nylon AMBA/6), polyamides mainly composed of 2,2,4-/2,4,4-trimethylhexamethylenediamine. terephthalate (nylon TMDT and nylon TMDT/6I), polyamides mainly composed of hexamethylenediamine isophthalate and/or hexamethylenediamine.terephthalate and containing, as a comonomer, bis(p-aminocyclohexyl) methane.isophthalate and/or bis(p-aminocyclohexyl) methane.terephthalate, bis(3-methyl-4-aminocyclohexyl) methane isophthalate and/or bis(3-methyl-4-aminocyclohexyl)methane.terephthalate or bis(p-aminocyclohexyl) propane.isophthalate and/or bis(p-aminocyclohexyl) propane.terephthalate (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T), polyamides mainly composed of hexamethylenediamine.isophthalate or hexamethylenediamine terephthalate and containing, as a comonomer, ε-caprolactam, 12-aminododecanoic acid, hexamethylenediamine.adipate, bis(p-aminocyclohexyl)methane.adipate or bis(3-methyl, 4-aminocyclohexyl)methane.adipate (nylon 6I, 6I/6T, 6I/12, 6T/6, 6T/66, 6I/PACM 6, 6I/DMPACM 6), and polyamides mainly composed of bis(p-aminocyclohexyl) methane.isophthalate or bis(3-methyl,4-aminocyclohexyl) methane.isophthalate and containing, as a comonomer, hexamethylenediamine.dodecanedioate or 12-aminododecanoic acid (nylon PACM I/612 and nylon DMPACM I/12).

The aromatic nuclear-hydrogenated copolyamide of component (B)(i) is an alicyclic copolyamide obtained by using cyclohexane 1,4-dicarboxylic acid or cyclohexane 1,3-dicarboxylic acid obtained by nuclear-hydrogenation of terephthalic acid or isophthalic acid in place of terephthalic acid or isophthalic acid which is an acid component of the above-mentioned aromatic copolyamides. Furthermore, nuclearhydrogenation product of diamines or diisocyanates such as 4,4'-diphenylmethane diisocyanate or tolylene diisocyanate, may also be used as a monomer.

The aliphatic polyamides of component (B)(ii) used in the present invention may be those known in the art. The aliphatic polyamides have a molecular weight of 10,000 or more and can be produced by bonding of equimolar of a saturated aliphatic dicarboxylic acid of 4–12 carbon atoms and an aliphatic diamine of 2–12 carbon atoms. However, in the production, if necessary, the diamines may be excessively used so as to provide more amine terminal groups than carboxyl terminal groups in the polyamide, or alternatively, a dibasic acid may be excessively used so as to provide more acid groups. Similarly, these polyamides can be conveniently produced from acid production derivatives and amine production derivatives such as esters, acid chlorides and amine salts, of the above mentioned acids and amines.

Typical examples of the aliphatic dicarboxylic acid used for production of the polyamides include adipic acid, pimelic acid, azelaic acid, suberic acid, sebacic acid and dodecanedioic acid.

On the other hand, typical examples of the aliphatic diamines include hexamethylenediamine and octamethylenediamine.

In addition, the aliphatic polyamides may also be produced by self-condensation of lactam.

Examples of the aliphatic polyamides are polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexyl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids selected from those used for production of the above-mentioned polymers, for example, polymers produced from adipic acid, sebacic acid and hexamethylenediamine. The aliphatic polyamides further include blends of above-mentioned polyamides such as a blend of nylon 6 and nylon 66 including copolymers such as nylon 66/6.

Preferably, the aliphatic polyamides used in the present invention are polyhexamethylene adipamide (nylon 66), polycaprolactam (nylon 6) and a blend of polyhexamethylene adipamide (nylon 66) with polycaprolactam (nylon 6).

The compatibilizing agent of component (C) used in the present invention is at least one compound selected from the group consisting of oxazoline and a compound having in its molecule (a) carbon-carbon double bond or carbon-carbon triple bond and (b) at least one functional group selected from carboxyl group, acid anhydride group, amino group, acid amide group, imido group, epoxy group, carboxylate group, isocyanate group, methylol group, oxazolidine group and hydroxyl group.

Examples of the compatibilizing agent are maleic anhydride, maleic acid, fumaric acid, maleimide, maleic hydrazide, reaction products of maleic anhydride and diamines, e.g., those having the structure represented by

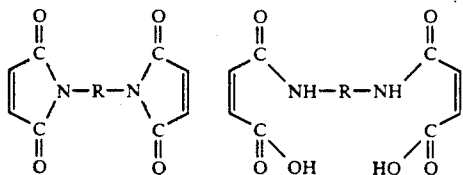

wherein R represents an aliphatic or aromatic group, methyl nadic anhydride, dichloromaleic anhydride, maleinamide, natural fats and oils such as soybean oil, tung oil, caster oil, linseed oil, hempseed oil, cottonseed oil, sesame oil, rapeseed oil, peanut oil, tsubaki oil, olive oil, coconut oil, and sardine oil, epoxidized natural fats and oils such as epoxidized soybean oil, unsaturated carboxylic acids such as acrylic acid, butenoic acid, crotonic acid, vinylacetic acid, itaconic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pen , α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid, endomethylenetetrahydrophthalic anhydride, esters, acid amides and anhydrides of these unsaturated carboxylic acids; unsaturated alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, and $C_nH_{2n-9}OH$ (wherein n is a positive integer), 3-butene 1,2-diol, 2,5-dimethyl-3-hexene-2,5-diol, 1,5-hexadiene-3,4-diol, and 2,6-octadiene-4,5-diol, unsaturated amines prepared by substituting the OH group of these unsaturated alcohols with —$NH_2$ group, glycidyl acrylate, glycidyl methacrylate, and allyl glycidyl ether. Further examples are modified products of a low molecular weight polymer, for example, having an average molecular weight of about 500–10000 or a high molecular weight polymers, for example, having an average molecular weight of higher than 10000, such as of butadiene and isoprene, to which maleic anhydride or phenol is added or amino group, carboxyl group, hydroxyl group or epoxy group is introduced.

It is needless to say that the compatibilizing agent (C) includes compounds containing two or more double bonds or triple bonds of the above group (a) and two or more identical or different functional groups of the above (b). Furthermore, it is also possible to use as the compatibilizing agent (C) two or more of the above-mentioned compounds in combination.

Suitably, the compatibilizing agents (C) are maleic anhydride, maleic acid, fumaric acid, itaconic acid, glycyl acrylate, glycidyl methacrylate and allyl glycidyl ether.

In the present invention, there may be used (D) rubber-like materials such as elastomers and polyolefin resins having low flexural modulus and/or modified rubber-like materials as impact strength modifier.

Examples of the rubber-like materials are ethylene propylene rubber, ethylene propylene nonconjugated diene rubber, ethylene butene rubber, propylene butene rubber, isoprene butylene rubber, polyisoprene, polybutadiene, styrene butadiene rubber, styrene butadiene styrene block copolymer, partially hydrogenated styrene butadiene block copolymer, styrene isoprene block copolymer, partially hydrogenated styrene isoprene block copolymer, and linear low-density polyethylene and mixtures thereof.

The modified rubber-like materials are those obtained by modifying the above-mentioned rubber-like materials with the compatibilizing agent (C). Examples of the modified rubber-like materials are maleic anhydride grafted ethylene propylene rubber, maleic anhydride grafted styrene butadiene styrene block copolymer, maleic anhydride grafted partially hydrogenated styrene butadiene block copolymer, and glycidyl methacrylate grafted ethylene propylene rubber.

The rubber-like material further includes copolymers with the compatibilizing agent such as ethylene-acrylate-maleic anhydride copolymer, ethyleneacrylateglycidyl methacrylate copolymer, ethylenevinyl acetate-glycidyl methacrylate copolymer and mixtures thereof.

Among the component (D), preferred are ethylene propylene rubber, ethylene butene rubber, styrene butadiene block copolymer, partially hydrogenated styrene butadiene block copolymer, styrene isoprene block copolymer, partially hydrogenated styrene isoprene block copolymer, linear low-density polyethylene having a density of 0.885–0.935 g/cm$^3$, preferably 0.885–0.925 g/cm$^3$ and grafted polymers obtained by grafting the compatibilizing agent (C) to these polymers. Also preferred are ethylene-methyl acrylate-maleic anhydride copolymer, ethylene-ethyl acrylate-maleic anhydride copolymer, ethylene-vinyl acetate-glycidyl methacrylate copolymer, ethylenemethyl acrylate-glycidyl methacrylate copolymer and mixtures thereof.

Addition amount of the component (D) has no special limitation, but preferably is 3–60 parts by weight based on 100 parts by weight of the total of the components (A), (B) and (C).

Blending method of the components (A), (B) and (C), if necessary and (D) is not critical. Known melt kneading methods can be employed as the blending method, and extruders, kneaders, rolls and the like, preferably extruders can be used as melt kneading apparatuses. There is no special limitation in sequence of addition of the components upon melt kneading. That is, there are a method which comprises adding all of the components (A). (B) and (C) at the same time and simultaneously melt-kneading them and a method which comprises previously melt-kneading components (A) and (C) in the presence or absence of a free-radical initiator and then adding component (B) and melt-kneading them. When component (D) as an impact strength modifier is added, there are also the following methods: a method which comprises adding component (D) together with components (A), (B) and (C) at the same time and simultaneously melt-kneading them; a method which comprises previously melt-kneading component (D) with components (A) and (C) in the presence or absence of a free-radical initiator and then adding component (B) and melt-kneading them; a method which comprises previously melt-kneading components (A) and (C) in the presence or absence of a free-radical initiator and then adding components (B) and (D) and melt-kneading them; and a method which comprises previously melt-kneading components (D) and (C) in the presence or absence of a free-radical initiator and then adding components (A) and (C) and melt-kneading them.

In the present composition, mixing ratio of components (A), (B) and (C) is as follows: components (A): 10–70 parts by weight, component (B): 90–30 parts by weight and component (C): 0.01–30 parts weight which is based on 100 parts by weight of sum of components (A) and (B). If amount of component (C) is less than 0.01 part by weight, mechanical strength of the thermoplastic resin composition is deteriorated and the desired effect of the present invention cannot be obtained, and if the amount is more than 30 parts by weight, appearance of the composition is inferior.

In the component (B), mixing ratio of thermoplastic aromatic copolyamide and/or aromatic nuclear-hydrogenated copolyamide to aliphatic polyamide is 0.1–70% by weight of the former to complementary 99.9–30% by weight of the latter, both of which are based on total polyamide present in the composition. If the amount of thermoplastic aromatic copolyamide and/or aromatic nuclear-hydrogenated copolyamide is less than 0.1% by weight, effect for improving reduction of stiffness when absorbing water conspicuously decreases and if the amount is more than 70% by weight, oil resistance of the resultant resin composition conspicuously decreases. Preferably, the mixing ratio of them is 0.5–50% by weight of thermoplastic aromatic copolyamide and/or aromatic nuclearhydrogenated copolyamide to complementary 99.5–50% by weight of diphatic polyamide, and more preferably, 0.5–25% by weight of the former to complementary 99.5–75% by weight of the latter. Further, most preferably, the mixing ratio of them is 0.5–7.5% by weight of the former to complementary 99.5–92.5% by weight of the latter. When the former is less than 7.5% by weight, there is very little degradation of heat resistance.

The polyphenylene ether of component (A) has a reduced viscosity ($\eta$sp/c) of 0.25–0.65 dl/g, preferably 0.35–0.60 dl/g measured at 25° C. in a chloroform solution of 0.5 g/dl in concentration. When the reduced viscosity is less than 0.25 dl/g or more than 0.65 dl/g, mechanical strengths, especially impact strength of the resultant thermoplastic composition decreases and thus the desired object cannot be attained. In addition, when it is more than 0.65 dl/g, flowability unfavorably decreases.

The resin composition of the present invention may further contain ordinary fillers such as glass fiber, glass flake, talc and mica, dyes, pigments, ultraviolet degradation inhibitors, heat stabilizers, flame-retardants, antioxidants, plastisizers and the like.

The molded products obtained from the thermoplastic resin composition of the present invention can be used suitably for automobile parts and electrical and electronic parts.

As examples of automobile parts to which the composition of the present invention can be applied, mention may be made of exterior trim parts such as bumper, fender, apron, hood panel, fascia, rocker panel, rocker panel reinforce. floor panel, rear quarter panel, door panel, door support, roof top, and trunk lid, interior trim parts such as instrument panel, console box, glove box, shift knob, pillar garnish, door trim, handle, arm rest, wind louver, carpet, heat rest, seat belt, and seat, interior parts of engine room such as distributor cap, air cleaner, radiator tank, battery case, radiator shroud, washer tank, cooling fan, and heater case, mirror body, wheel cover, trunk trim, trunk mat and gasoline tank.

The following examples further illustrate the present invention, but the present invention is not limited to them.

In the examples, reduced viscosity ($\eta$sp/c) of polyphenylene ether was measured at 25° C. in a chloroform solution of 0.5 g/dl. Heat distortion temperature (HDT), Izod impact strength with notch (NI) and flexural modulus of the resin composition were measured according to ASTM D648, D256 and D790, respectively.

Any of the resin compositions to be subjected to injection molding for preparation of test pieces was subjected to vacuum-drying at 120° C. for 6 hours prior to use. Properties of test pieces were measured after they were left to stand for 48 hours in an air atmosphere of 23° C. and 50% R.H., except that flexural modulus when absorbing water and water absorption rate were measured after they were left to stand for 7 days (168 hours) in an air atmosphere of 23° C. and 50% R.H.

The water absorption rate was measured by a Karl Fischer water content measuring machine CA-05 with vaporizer VA-05 manufactured by Mitsubishi Kasei Corp.

Thermal expansion coefficient was measured in the following manner: Test piece (HDT) injection-molded under the above conditions was left to stand for 48 hours in air atmosphere of 23° C. and 50% R.H., and test pieces of 5 mm×5 mm×5 mm were cut out in the flowing direction upon molding of resin composition (in the MD). Thermal expansion coefficient in the MD of this test piece was measured in the range of from −40° C. to 80° C. As a measuring apparatus, Thermal Analyzer DT-40 manufactured by Shimadzu Corp. was used.

Dumbbell specimens of ASTM standard were molded under the injection molding conditions of cylinder temperature 290° C. and mold temperature 80° C. Injection molding machine was IS 150E manufactured by Toshiba Machine Co., Ltd.

REFERENCE EXAMPLE 1

Preparation of Polyphenylene Ether Resin in Accordance With the Process Disclosed in Japanese Patent Publication (Kokoku) No. 60-46129

A reactor of 1.5 m$^3$ was charged with 122.2 kg of 2,6-dimethylphenol, 366.5 kg of xylene, 122.2 kg of methanol, 2.4 kg of sodium hydroxide, 0.55 kg of Eriochrome Black T manufactured by Nakai Kagaku Yakuhin Kabushiki Kaisha, 1.49 kg of 2-pipecoline and 0.099 kg of manganese chloride tetrahydrate. Air was blown into the reactor at a rate of 300 NI/min. for 10 hours with stirring the mixture to effect oxidation polymerization reaction. During the reaction, temperature of reaction mixture was kept at 30° C. and pressure of reaction system was kept at 8 kg/cm$^2$G. After termination of the reaction, posttreatment was conducted by ordinary method to obtain 119 kg of poly(2,6-dimethyl-1,4-phenylene)oxide having a reduced viscosity of 0.535 dl/g.

REFERENCE EXAMPLE 2

Preparation of Thermoplastic Aromatic Copolyamide-6I/6T/PACM I/PACM T (63.5/27.2/6.5/2.8) in Accordance With the Process Disclosed in Japanese Patent Publication (Kokoku) No. 62-28983

6I means a unit of hexamethylenediamine (HMD) and isophthalic acid (I), 6T means a unit of HMD and terephthalic acid (T), PACM I means a unit of PACM and I, and PACM T means a unit of PACM and T. PACM means bis(p-aminocyclohexyl)methane.

20.6 kg of HMD having concentration of 82.03% and 2.38 kg of PACM were added to 63.6 kg of water. The resulting mixture was heated, followed by adding 18.7 kg of isophthalic acid and 8.04 kg of terephthalic acid. Then, pH of the mixture was adjusted to 8.60 using a small amount of HMD. To this salt solution were added 49 g of sodium phenylphosphinate, 97 g of 4,4'-butylidenebis(6-t-butyl-m-cresol), 20 ml of 10% emulsion of polydimethylsiloxane and 14 ml of glacial acetic acid.

The resultant salt mixture was kept at a temperature of 70°–80° C.

Then, this salt mixture was filled in an autoclave and heated to 175° C and pressurized under 12.7 kg/cm$^2$. Water was gradually removed and the pressure was maintained at 12.7 kg/cm$^2$ until temperature of batch reached 226° C. Then, pressure was gradually reduced to atmospheric pressure and finally vacuum. Then, batch temperature was raised to about 270° C. When molecular weight of the batch reached the desired value, the inside of the autoclave was pressurized with nitrogen gas and the resulting polymer was extruded to cylindrical strands. The strands were rapidly cooled in water and cut to pellets.

With regard to the acid and diamine used, the copolyamide contained 70% of isophthalic acid and 30% of terephthalic acid (totally 100% of acids) and 90.5% of HMD and 9.5% of PACM (totally 100% of diamines).

REFERENCE EXAMPLE 3

Preparation of Maleic Anhydride Grafted Ethylene-Propylene Rubber EPR

100 Parts by weight of EPR, i.e., Esprene® E-120 manufactured by Sumitomo Chemical Co., Ltd., 1.5 parts by weight of styrene monomer, 1.5 parts by weight of maleic anhydride and 0.1 part by weight of a free-radical iniciator, i.e., dicumyl peroxide (DCP) manufactured by Nippon Oil & Fats Co., Ltd. were previously mixed well using Henschel mixer, and then extruded by the same twin-screw extruder manufactured by Nippon Seikosho Kabushiki Kaisha as used in the following Examples. Cylinder temperature was set at 230° C. and screw speed was set at 190 rpm.

REFERENCE EXAMPLE 4

Preparation of Maleic Anhydride Grafted Partially Hydrogenated Styrene Butadiene Styrene Block Copolymer Modification with maleic anhydride was effected in the same manner as in Reference Example 3 except that a partially hydrogenated styrene butadiene block copolymer, i.e., Kraton® G1650 manufactured by Shell Chemical Co. was used as EPR.

In all of the following Examples and Comparative Examples, kneading was carried out by twin-screw extruder TEX 44 manufactured by Nippon Seikosho Kabushiki Kaisha. This extruder had L/D=32 and was provided with a first feed opening and with a second feed opening at the position of L/D=16.

EXAMPLES 1–3

In all of Examples 1–3 and Comparative Example 1, polyphenylene ether prepared in Reference Example 1, maleic anhydride as a compatibilizing agent and maleic anhydride grafted ethylene propylene rubber prepared in Reference Example 3 as an impact strength modifier and dicumyl peroxide, i.e., Sanperox® DCP manufactured by Sanken Kako Co. were previously mixed well using a tumbler mixer, and the mixture was fed from the first feed opening. Polyamide was fed from the second feed opening.

Cylinder temperature was set at 260° C. and screw speed was set at 360 rpm. Mixing ratio of raw materials in each example was that shown in Table 1. Where two or more polyamides were fed from the second feed opening, these were mixed well using tumbler mixer before feeding.

In Examples 1–3 and Comparative Example 1, commercially available nylon 6, i.e., A1030 BRL manufactured by Unitika Ltd. was used as an aliphatic polyamide. In Examples 1 and 2, Grilamid® XE3038 manufactured by EMS CHEMIM Co. was used and in Example 3 the copolyamide prepared in Reference Example 2 was used as thermoplastic aromatic copolyamide.

Thus, resin compositions were produced.

COMPARATIVE EXAMPLE 1

A resin composition was prepared at the same mixing ratio and under the same extruding conditions as in Examples 1-3 except that the same nylon 6 as used in Examples 1-3 was used in place of aromatic copolyamide.

EXAMPLE 4

A resin composition was prepared at the same mixing ratio and under the same extruding conditions as in Example 1 except that a commercially available nylon 66, i.e., 2020B manufactured by Ube Industries, Ltd. was used as aliphatic polyamide in place of nylon 6 and Trogamid T ® 2010 manufactured by Dynamite Nobel Co. was used as aromatic copolyamide.

COMPARATIVE EXAMPLE 2

A resin composition was prepared at the same mixing ratio and under the same extruding conditions as in Example 4 except that the same nylon 66 as used in Example 4 was used in place of aromatic copolyamide.

EXAMPLE 5

A resin composition was prepared at the same mixing ratio and under the same extruding conditions as in Example 1 except that amount of polyphenylene ether was 53 parts by weight, that of nylon 6 was 36 parts by weight and that of aromatic copolyamide was 1 part by weight and fumaric acid was used in place of maleic anhydride.

COMPARATIVE EXAMPLE 3

A resin composition was prepared at the same mixing ratio and under the same extruding conditions as in Example 5 except that nylon 6 was used in place of aromatic copolyamide.

EXAMPLE 6

A resin composition was prepared at the same mixing ratio and under the same extruding conditions as in Example 1 except that poly(2,6-dimethyl 1,4-phenylene ether) having a $\eta sp/c$ of 0.42 dl/g manufactured by Japan Polyether Co. was used as polyphenylene ether.

COMPARATIVE EXAMPLE 4

A resin composition was prepared at the same mixing ratio and under the same extruding conditions as in Example 6 except that nylon 6 was used in place of aromatic copolyamide.

EXAMPLE 7

A resin composition was prepared at the same mixing ratio and under the same extruding conditions as in Example 3 except that raw material components for the resin composition were all fed from the first feed opening.

EXAMPLE 8

A resin composition was prepared at the same mixing ratio and under the same extruding conditions as in Example 1 except that maleic anhydride grafted partially hydrogenated styrene butadiene styrene block copolymer was used as an impact strength modifier in place of maleic anhydride grafted ethylene propylene rubber and maleic anhydride and dicumyl peroxide were not used.

COMPARATIVE EXAMPLE 5

A resin composition was prepared at the same mixing ratio and under the same extruding conditions as in Example 8 except that nylon 6 was used in place of aromatic copolyamide.

EXAMPLE 9

A resin composition was prepared at the same mixing ratio and under the same extruding conditions as in Example 3 except that partially hydrogenated styrene isoprene block copolymer, i.e., Kraton G ® 1701 manufactured by Shell Chemical Co. was used as an impact strength modifier in place of maleic anhydride grafted ethylene propylene rubber and glycidyl methacrylate was used in place of maleic anhydride.

Results obtained in Examples are shown in Table 1 and results obtained in Comparative Examples are shown in Table 2.

TABLE 1

| | Unit | Example 1 | Example 2 | Example 3 | Example 4 | Example 5 | Example 6 | Example 7 | Example 8 | Example 9 |
|---|---|---|---|---|---|---|---|---|---|---|
| Polyphenylene ether | wt. part | 50 | 50 | 50 | 50 | 53 | 50 | 50 | 50 | 50 |
| Impact strength modifier | " | mEPR 10 | mEPR 10 | mEPR 10 | mEPR 10 | mEPR 10 | mEPR 10 | mEPR 10 | mSEBS 10 | SEP 10 |
| Nylon 6 | " | 37 | 30 | 37 | — | 36 | 37 | 37 | 37 | 37 |
| Nylon 66 | " | — | — | — | 37 | — | — | — | — | — |
| Aromatic copolyamide | " | 3 | 10 | 3 | 3 | 1 | 3 | 3 | 3 | 3 |
| Maleic anhydride | " | 0.5 | 0.5 | 0.5 | 0.5 | — | 0.5 | 0.5 | — | — |
| Fumaric acid | " | — | — | — | — | 0.5 | — | — | — | — |
| Glycidyl methacrylate | " | — | — | — | — | — | — | — | — | 0.5 |
| DCP | " | 0.01 | 0.01 | 0.01 | 0.01 | 0.01 | 0.01 | 0.01 | — | 0.01 |
| Flexural modulus | kg/cm$^2$ | 20900 | 21000 | 21000 | 21800 | 20900 | 20800 | 20800 | 21500 | 21200 |
| Flexural modulus when absorbing water | kg/cm$^2$ | 17300 | 20100 | 17700 | 18500 | 17000 | 17100 | 17200 | 18400 | 18300 |
| Reduction rate | % | 17.2 | 4.3 | 15.7 | 15.1 | 18.7 | 17.8 | 17.3 | 14.9 | 13.7 |
| Izod with notch | kg cm/cm | 58 | 53 | 55 | 30 | 53 | 51 | 11 | 18 | 56 |
| Heat distortion temp. | °C | 183 | 170 | 181 | 198 | 183 | 179 | 181 | 184 | 183 |
| Thermal expansion coefficient | $\times 10^{-5}$ | 7.1 | 6.6 | 7.0 | 6.3 | 8.0 | 7.3 | 7.0 | 6.1 | 6.9 |

"mEPR": Maleic anhydride grafted ethylene propylene rubber.
"mSEBS": Maleic anhydride grafted partially hydrogenated styrene butadiene styrene block copolymer.
"SEP": Partially hydrogenated styrene isoprene block copolymer.
"DCP": Dicumyl peroxide.

TABLE 2

|  | Unit | Comparative Example 1 | Comparative Example 2 | Comparative Example 3 | Comparative Example 4 | Comparative Example 5 |
|---|---|---|---|---|---|---|
| Polyphenylene ether | wt. part | 50 | 50 | 50 | 50 | 50 |
| Impact strength modifier | " | mEPR 10 | mEPR 10 | mEPR 10 | mEPR 10 | mSEBS 10 |
| Nylon 6 | " | 40 | — | 37 | 40 | 40 |
| Nylon 66 | " | — | 40 | — | — | — |
| Aromatic copolyamide | " | — | — | — | — | — |
| Maleic anhydride | " | 0.5 | 0.5 | — | 0.5 | — |
| Fumaric acid | " | — | — | 0.5 | — | — |
| Glycidyl methacrylate | " | — | — | — | — | — |
| DCP | " | 0.01 | 0.01 | 0.01 | 0.01 | — |
| Flexural modulus | kg/cm$^2$ | 20300 | 21800 | 20400 | 21000 | 21200 |
| Flexural modulus when absorbing water | kg/cm$^2$ | 15300 | 17000 | 15900 | 15900 | 16300 |
| Reduction rate | % | 24.6 | 22.0 | 22.1 | 24.6 | 23.1 |
| Izod with notch | kg cm/cm | 63 | 35 | 61 | 59 | 18 |
| Heat distortion temp. | °C. | 185 | 203 | 183 | 181 | 184 |
| Thermal expansion coefficient | $\times 10^{-5}$ | 8.6 | 7.7 | 8.4 | 8.1 | 8.4 |

"mEPR": Maleic anhydride grafted ethylene propylene rubber.
"mSEBS": Maleic anhydride grafted partially hydrogenated styrene butadiene styrene block copolymer.
"SEP": Partially hydrogenated styrene isoprene block copolymer.
"DCP": Dicumyl peroxide.

The thermoplastic resin composition of the present invention which comprises, at a specific mixing ratio, a polyphenylene ether, an aromatic copolyamide and/or aromatic nuclear-hydrogenated copolyamide, a compatibilizing agent and a rubber-like material, can be molded into products which are prevented from reduction in flexural modulus when absorbing water and which are low in thermal expansion coefficient, and thus the present thermoplastic resin composition can be applied to various uses.

This novel resin composition can be easily processed into shaped articles, sheets, films and the like by ordinary methods employed for thermoplastic resins such as injection molding and extrusion molding. These products have very good balances in properties such as impact resistance, heat resistance and flexural stiffness. The composition is especially useful for injection molding.

We claim:

1. A thermoplastic resin composition which comprises:
   (A) 10-70 parts by weight of a polyphenylene ether, a mixture of a polyphenylene ether and a polystyrene or a polyphenylene ether-styrene graft copolymer,
   (B) 90-30 parts by weight of a mixture of (i) at least one copolyamide selected from the group consisting of a thermoplastic aromatic copolyamide and an aromatic nuclear-hydrogenated copolyamide in an amount of 0.1-70% by weight of existing total polyamide and (ii) a thermoplastic aliphatic polyamide in a complementary amount of 99.9-30% by weight of existing total polyamide, and
   (C) 0.01-30 parts by weight, based on 100 parts by weight of the above components (A) and (B), of at least one compound selected from the group consisting of oxazoline and a compound having, in its molecule, (a) carbon-carbon double bond or a carbon-carbon triple bond and (b) at least one functional group selected from carboxyl group, acid anhydride group, amino group, acid amide group, imido group, epoxy group, carboxylate ester group, isocyanate group, methylol group, oxazolidine group and hydroxyl group.

2. A composition according to claim 1 wherein the polyphenylene ether (A) is at least one polymer selected from the group consisting of poly(2,6-dimethyl-1,4-phenylene ether) and a copolymer of 2,6-dimethylphenol and 2,3,6-trimethylphenol.

3. A composition according to claim 2 wherein the polyphenylene ether has a reduced viscosity ($\eta sp/c$) of 0.25-0.65 dl/g measured at 25° C. in chloroform solution of 0.5 g/dl.

4. A composition according to claim 1 wherein the thermoplastic aliphatic polyamide in the component (B) has an average molecular weight of 10,000 or more and is prepared by self-condensation of lactam or $\omega$-amino acid of 4-12 carbon atoms, or by bonding equimolar saturated aliphatic dicarboxylic acid containing 4-12 carbon atoms and aliphatic diamine containing 2-12 carbon atoms.

5. A composition according to claim 1 wherein the thermoplastic aromatic copolyamide in the component (B) are polyamides obtained from (1) at least one acid selected from the group consisting of the following (a) and (b) and (2) at least one amine selected from the group consisting of the following (c), (d), (e), (f) and (g):
   (a) terephthalic acid,
   (b) isophthalic acid,
   (c) hexamethylenediamine,
   (d) trimethylhexamethylenediamine,
   (e) bis(p-aminocyclohexyl)methane,
   (f) bis(p-aminocyclohexyl)propane,
   (g) bis(3-methyl-4-aminocyclohexyl)methane.

6. A composition according to claim 1 wherein the thermoplastic aromatic nuclear-hydrogenated copolyamide in the component (B) are polyamides obtained from (1) at least one acid selected from the group consisting of the following (a) and (b) and (2) at least one amine selected from the group consisting of the following (c), (d), (e), (f) and (g):
   (a) terephthalic acid and/or its derivative,
   (b) isophthalic acid and/or its derivative,
   (c) hexamethylenediamine,
   (d) trimethylhexamethylenediamine,
   (e) bis(p-aminocyclohexyl)methane,
   (f) bis(p-aminocyclohexyl)propane,
   (g) bis(3-methyl-4-aminocyclohexyl) methane.

7. A composition according to claim 5 wherein the thermoplastic aromatic copolyamide in the component (B) further comprises a unit of a lactam, a unit of $\omega$- amino acid of 4-12 carbon atoms or a unit derived from an aliphatic dicarboxylic acid of 4-12 carbon atoms and an aliphatic diamine of 2-12 carbon atoms.

8. A composition according to claim 6 wherein the thermoplastic aromatic nuclear-hydrogenated copolyamide in the component (B) further comprises a unit of lactam, a unit of ω-amino acid of 4-12 carbon atoms or a unit derived from an aliphatic dicarboxylic acid of 4-12 carbon atoms and an aliphatic diamine of 2-12 carbon atoms.

9. A composition according to claim 5 or 6 wherein amine (2) is a mixture of (c) with at least one of (e) (f) and (g) at a ratio of 99.5-50 mol % of the former (c) and 0.5-50 mol % of the latter, (e), (f) and (g).

10. A composition according to claim 5 wherein the acid (1) comprises 2-60 mol % of terephthalic acid (a) and 40-98 mol % of isophthalic acid (b) based on 100 mol % of total acid, and amine (2) comprises 98-50 mol % of hexamethylenediamine (c) and 2-50 mol % of at least one amine selected from (e), (f) and (g) based on 100 mol % of total amine.

11. A composition according to claim 5 wherein acid (1) comprises 20-40 mol % of terephthalic acid (a) and 60-80 mol % of isophthalic acid (b) based on 100 mol % of total acid, and amine (2) is a mixture of 94-98 mol % of hexamethylenediamine (c) with 2-6 mol % of at least one amine selected from (e), (f) and (g) based on 100 mol % of total amine.

12. A composition according to claim 5 or 6 wherein acid (1) is mainly composed of terephthalic acid or its dimethyl ester (a) and amine (2) is mainly composed of at least one diamine selected from the group consisting of 2,2,4-trimethylhexamethylenediamine and 2,4,4-trimethylhexamethylenediamine.

13. A composition according to claim 5 or 6 wherein acid (1) is mainly composed of a mixture of terephthalic acid (a) and isophthalic acid (b) at a mixing ratio of 3:7, and amine (2) is mainly composed of hexamethylenediamine (c).

14. A composition according to claim 1 which additionally contains 3-60 parts by weight of (D) at least one material selected from the group consisting of a rubber-like material and a modified rubber-like material as an impact strength modifier based on 100 parts by weight of components (A), (B) and (C).

15. A composition according to claim 1 which comprises 10-70 parts by weight of component (A), 90-30 parts by weight of component (B) and 3-60 parts by weight based on 100 parts by weight of components (A) and (B) of modified rubber-like material (D).

16. A molded article for automobile parts which is made from the composition according to claim 1.

17. A molded article according to claim 16 wherein the automobile parts are cylinder head cover, radiator head tank, spoiler, bumper, fender, wheel cover or side seal garnish.

18. A composition according to claim 1, wherein said mixture (B) is a mixture of (i) at least one copolyamide selected from the group consisting of a thermoplastic aromatic copolyamide and an aromatic nuclear-hydrogenated copolyamide in an amount of 0.5-7.5% by weight of existing total polyamide and (ii) a thermoplastic aliphatic polyamide in a complementary amount of 99.5-92.5% by weight of existing total polyamide.

* * * * *